United States Patent
Pike

(10) Patent No.: US 7,390,371 B2
(45) Date of Patent: Jun. 24, 2008

(54) FABRICATION PROCESS FOR EMBEDDING OPTICAL BAND GAP STRUCTURES IN A LOW TEMPERATURE CO-FIRED CERAMIC SUBSTRATE

(75) Inventor: Randy T. Pike, Grant, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/556,355

(22) Filed: Nov. 3, 2006

(65) Prior Publication Data

US 2007/0056677 A1    Mar. 15, 2007

Related U.S. Application Data

(62) Division of application No. 10/762,124, filed on Jan. 20, 2004, now Pat. No. 7,199,437.

(51) Int. Cl.
*C03B 29/00* (2006.01)
*H01L 21/00* (2006.01)

(52) U.S. Cl. ................................. 156/89.12
(58) Field of Classification Search .......... 156/89.11, 156/89.12
See application file for complete search history.

(56) References Cited

U.S. PATENT DOCUMENTS

| | | | |
|---|---|---|---|
| 5,114,750 A | | 5/1992 | Howard |
| 5,386,339 A | * | 1/1995 | Polinski, Sr. ............... 361/719 |
| 5,661,647 A | | 8/1997 | Washburn et al. |
| 6,181,864 B1 | | 1/2001 | Jang et al. |
| 6,384,473 B1 | * | 5/2002 | Peterson et al. ............. 257/680 |
| 6,406,196 B1 | | 6/2002 | Uno et al. |
| 6,414,340 B1 | | 7/2002 | Brar |
| 6,420,728 B1 | | 7/2002 | Razeghi |
| 6,426,523 B1 | | 7/2002 | Yamaguchi et al. |
| 6,445,020 B2 | | 9/2002 | Fujimura |
| 6,454,468 B1 | | 9/2002 | Yoon et al. |
| 6,686,044 B2 | | 2/2004 | Nakai et al. |
| 6,766,082 B2 | | 7/2004 | Hirabayashi et al. |
| 7,030,824 B1 | * | 4/2006 | Taft et al. ................... 343/767 |
| 7,199,437 B2 | * | 4/2007 | Pike ........................... 257/432 |
| 2001/0023028 A1 | * | 9/2001 | Miyake et al. .............. 428/624 |
| 2001/0029095 A1 | * | 10/2001 | Tadauchi et al. ............ 438/612 |
| 2002/0056852 A1 | | 5/2002 | Scott et al. |
| 2002/0057883 A1 | * | 5/2002 | Malone et al. .............. 385/136 |
| 2002/0130408 A1 | * | 9/2002 | Pike et al. ................... 257/714 |
| 2003/0020173 A1 | * | 1/2003 | Huff et al. ................... 257/774 |
| 2003/0039843 A1 | | 2/2003 | Johnson et al. |
| 2003/0140317 A1 | * | 7/2003 | Brewer et al. ................. 716/1 |
| 2003/0169575 A1 | * | 9/2003 | Ikuta et al. .................. 361/761 |
| 2004/0016995 A1 | * | 1/2004 | Kuo et al. ................... 257/678 |
| 2004/0046248 A1 | * | 3/2004 | Waelti et al. ................ 257/712 |

* cited by examiner

*Primary Examiner*—Melvin C Mayes
(74) *Attorney, Agent, or Firm*—Darby & Darby; Robert J. Sacco

(57) ABSTRACT

A method for embedding optical band gap (OBG) devices in a ceramic substrate (100). The method includes the step (320) of pre-forming an OBG structure (105). The OBG structure can be a micro optical electromechanical systems (MOEMS) device. Further, the OBG structure can be preformed from indium phosphide and/or indium gallium arsenide. The method also includes the step (325) of coating the OBG structure with a surface binding material (230). The surface binding material can be comprised of calcium and hexane. The ratio of the calcium to hexane can be from about 1% to 2%. At a next step (330), the OBG structure can be inserted into the ceramic substrate. A pre-fire step (335) and a sintering step (340) then can be performed on the substrate.

10 Claims, 3 Drawing Sheets

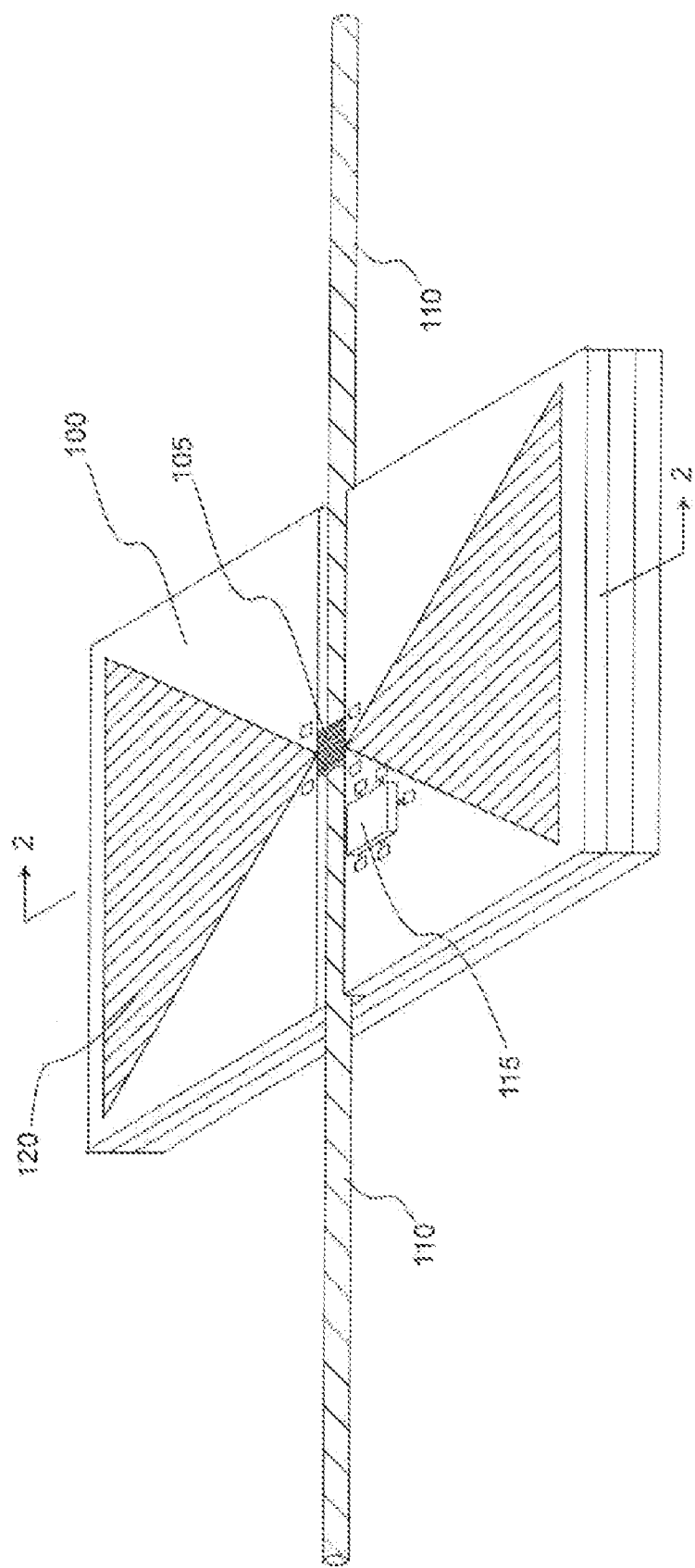

FABRICATION PROCESS FOR EMBEDDING OPTICAL BAND GAP STRUCTURES IN A LOW TEMPERATURE CO-FIRED CERAMIC SUBSTRATE

CROSS REFERENCE TO RELATED APPLICATIONS

This application is a divisional of U.S. patent application Ser. No. 10/762,124 filed on Jan. 20, 2004 now U.S. Pat. No. 7,199,437. The aforementioned related patent application is herein incorporated by reference.

BACKGROUND OF THE INVENTION

1. Statement of the Technical Field

The inventive arrangements relate generally to the field of micro-opto-electrical-mechanical systems (MOEMS).

2. Description of the Related Art

The use of micro optical electromechanical systems (MOEMS) devices has proliferated in recent years. Currently, MOEMS device are used spectrometers, computing systems, probes, microfluidic devices, communications equipment, and numerous other applications. Nonetheless, new applications for MOEMS devices continue to be discovered.

MOEMS devices typically are made using semiconductor wafer fabrication techniques, for example using semiconductive materials and optical bandgap materials such as indium phosphide (InP) and indium gallium arsenide (InGaAs). Semiconductive materials, however, typically exhibit a high loss tangent at microwave and optical frequencies and have limited power handling capability. Moreover, the permittivity of semiconductors can vary significantly from DC to 40 GHz. Thus, although semiconductive materials may be used within certain components in a microwave circuit, semiconductive materials typically are not used as the primary substrate in such circuits.

A common material that is used as a primary substrate in microwave circuits is low temperature co-fired ceramic (LTCC). Notably, LTCC maintains a fairly constant permittivity from DC to over 40 GHz and LTCC provides a low tangent. Hence, LTCC can be used to realize a wide range of RF and microwave circuits. Notwithstanding the aforementioned advantages of LTCC, conventional LTCC substrate fabrication techniques require specific customized adaptive processes to accommodate InP and InGaAs subsystem components. Such fabrication processes usually are very complicated and costly to implement. In consequence, an efficient fabrication process for embedding MOEMS devices in LTCC has not been available.

SUMMARY OF THE INVENTION

The present invention relates to a method for embedding optical band gap devices in a ceramic substrate. The method includes the step of pre-forming an optical band gap (OBG) structure. The OBG structure can be a micro optical electromethcanical systems (MOEMS) device. Further, the OBG structure can be preformed from indium phosphide and/or indium gallium arsenide.

The method also includes the step of coating the OBG structure with a surface binding material. The surface binding material can be comprised of calcium and hexane. The ratio of the calcium to hexane can be from about 1% to 2%. The method further includes the step of inserting the OBG structure into the ceramic substrate. For example, the OBG structure can be inserted into a via formed within the ceramic substrate. The ceramic substrate can include a plurality of substrate layers comprised of a low temperature co-fired ceramic (LTCC).

The method also can include the step of performing firing operations on the ceramic substrate. For example, the ceramic substrate can be pre-fired at a first temperature for a first duration of time, sintered at a second temperature for a second duration of time, and sintered at a third temperature for a third duration of time. After the pre-fire and sintering operations, the ceramic substrate can be slowly cooled.

The present invention also relates to an OBG structure having a surface coating of a surface binding material which can be disposed within a via in the ceramic substrate. The surface binding material can be calcium and/or hexane wherein a ratio of the calcium to the hexane is from about 1% to 2%. The OBG structure can include indium phosphide and/or indium gallium arsenide. The ceramic substrate can include a plurality of substrate layers comprised of a LTCC. The OBG structure can be a micro optical electromechanical systems (MOEMS) device.

BRIEF DESCRIPTION OF THE DRAWINGS

FIG. 1 is a perspective view of a ceramic substrate having an embedded optical band gap (OBG) structure that is useful for understanding the present invention.

DETAILED DESCRIPTION OF THE PREFERRED EMBODIMENTS

Figure 2A:
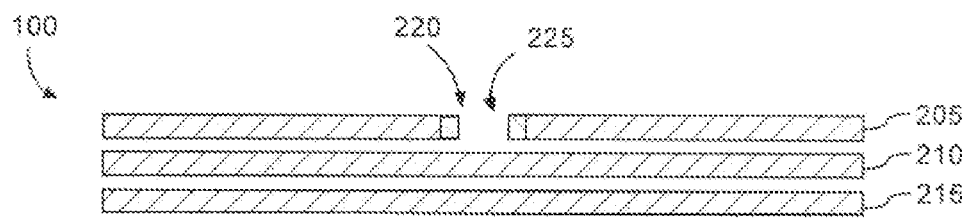
FIGS. 2A-2D are cross sectional views of the ceramic substrate of FIG. 1, taken along section lines 2-2, which illustrate an exemplary process for manufacturing a ceramic substrate having an embedded OBG structure.

An embodiment in accordance with the present invention relates to an efficient fabrication process for embedding optical band gap (OBG) structures within a ceramic substrate. Accordingly, the present invention provides a circuit designer with an added level of flexibility by providing a cost effective solution for implementing OBG structures within RF and microwave circuits. Thus, a wide variety of RF and microwave circuits can be designed to use the OBG structures, while still benefiting from the advantageous electrical characteristics of a ceramic substrate.

Referring to FIG. 1, an exemplary ceramic substrate 100 having an embedded OBG structure 105 is shown. The ceramic substrate 100 can be formed from any suitable ceramic material, for example low temperature co-fired ceramic (LTCC) or high temperature co-fired ceramic (HTCC). An example of LTCC material that can be used is 951 Green Tape™, available from The Du Pont Company of Research Triangle Park, N.C. 27709. The relative permittivity ($\epsilon_r$) of 951 Green Tape™ is approximately 7.8. Another LTCC material that can be used is part number K2400 available from Ferro Corp. of Cleveland, Ohio 44114. K2400 has a relative permittivity ($\epsilon_r$) of approximately 2400. Still, there are a variety of other ceramic materials that can be used and the invention is not so limited. Further, one or more substrate layers can be used.

The OBG structure 105 can be a micro electromechanical systems (MEMS) device, for example a micro optical electromechanical systems (MOEMS) device, as shown. MOEMS devices are known to the skilled artisan. Examples of MOEMS devices include optical filters, optical waveguides, laser diode correctors, optical beam shapers, beam splitters, diffusers, deformable mirrors, microlens arrays, and so on. It should be noted that this list of devices is by no means comprehensive. There are a myriad of other MOEMS devices which can be embedded with a ceramic substrate using the fabrication process provided by the present invention, and thus are covered by the intended scope of the invention.

The OBG structure 105 can receive optical data via one or more optical fibers 110 and process such data. For example, in the case that the OBG structure 105 is a photodiode, the photodiode can output a digital signal correlating to the received optical data. The digital signal can be processed, for example using a micro-transmitter 115, and forwarded to another circuit component, for instance a bi-conical antenna 120. Importantly, this is just one example which illustrates one potential use of an OBG structure 105 embedded within a ceramic substrate 100. It will be appreciated by those skilled in the art that the range of circuits which can receive benefit from the use of embedded OBG structures is limitless.

FIGS. 2A-2D are sectional views of the ceramic substrate of FIG. 1, taken along section lines 2-2, depicting an exemplary manufacturing process for manufacturing a ceramic substrate having an embedded OBG structure. Referring to FIG. 2A, one or more ceramic substrate layers can be provided to form a substrate 100. For example a first substrate layer 205, a second substrate layer 210, and a third substrate layer 215 can be provided. Three substrate layers are shown for exemplary purposes, but it should be noted than any number of substrate layers can be used.

One or more vias 220 can be formed within the first substrate layer 205. Vias also can be formed within other substrate layers as well. For example, vias can be formed in a second substrate layer 210 and/or the third substrate layer 215. As defined herein, a via is a bore which extends into a substrate layer or extends completely through the substrate layer. Further, a via is not limited to any particular shape. For instance, a via can be cylindrical, rectangular or any other shape.

The via 220 can be positioned in the substrate layer 205 such that the via 220 forms a continuous opening with one or more grooves 225. The grooves 225 can be useful for the placement of optical fibers that can mate to the OBG structure. Accordingly, the OBG structure and associated optical fibers can be embedded within the substrate 100.

Many techniques are available for forming vias in a substrate layer. For example, vias can be formed by laser cutting holes through the substrate, drilling holes through the substrate, or mechanically punching the holes. It should be noted that the tolerance of mechanically punched vias can be tightly controlled. For instance, tolerances of ±0.1 mils can be maintained. Further, if a substrate is used that is subject to shrinkage, the substrate can be preconditioned before being used in a fabrication process in order to minimize shrinkage after the vias have been formed. Such shrinkage can cause the tolerance of the vias to vary. Although vias typically extend through an entire layer, the invention is not so limited. For instance, a bore can be cut or drilled to any desired depth within a substrate layer to form a cavity within the substrate layer.

In one arrangement, a preconditioning process can be applied to the substrate layers 205, 210, 215 prior to the vias or grooves being formed within the substrate layers 205, 210, 215. For example, the substrate layers 205, 210, 215 can be baked at an appropriate temperature for a specified period of time or left to stand in a nitrogen dry box for a specified period of time. Common preconditioning cycles for ceramic material are 120° C. for 20-30 minutes or 24 hours in a nitrogen dry box. Both preconditioning process are well known in the art of ceramic substrates.

After the via 220 is formed within the substrate layer 205, conductive layers then can be deposited on the substrate layers 205, 210, 215, where required. For example, the conductive layers can be deposited using a conventional thick film screen printing process. The substrate layers then can be baked to dry the conductive layers using a suitable drying process.

The substrate layers 205, 210, 215 can be joined to form a sub-stack. Various methods can be used to join the substrate layers. For example, the layers 205, 210, 215 can be laminated together using a variety of lamination methods. In one method, the substrate layers 205, 210, 215 can be stacked and hydraulically pressed with heated platens. For instance, a uniaxial lamination method can press the ceramic substrates layers together at 3000 psi for 10 minutes using plates heated to 70° C. The substrate layers 205, 210, 215 can be rotated 180° following the first 5 minutes. In an isotatic lamination process, the substrate layers 205, 210, 215 can be vacuum sealed in a plastic bag and then pressed using heated water. The time, temperature and pressure can be the same as those used in the uniaxial lamination process, however, rotation after 5 minutes is not required.

A temperature release tape, such as P/N 3195M, available from Nitto Denko Co., Ltd. of Hong Kong, can be used to facilitate stacking of substrate layers during the lamination process. The temperature release tape can be disposed between substrate layers to minimize distortions of the substrate layers during the lamination process. The tape can be released from the substrate layers during the baking process.

Figure 2B:
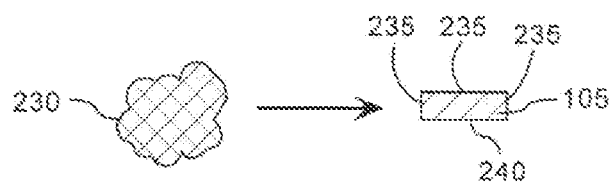

After being pre-formed, for example being machined, cast and/or formed, the OBG structure 105 can be prepared for being embedded into the substrate, as shown in FIG. 2B. In particular, portions of the OBG structure 105 which will be in contact with the substrate can be brush coated with a surface binding material 230. For example, the surface binding 230 can be applied to walls 235 and bottom portion 240 of the OBG structure 105. The surface binding material 230 can provide adhesion between the OBG structure 105 and the substrate.

The binding material 230 can be a solution comprising calcium ($Ca^{2+}$) and hexane ($CH_3(CH_2)_4CH_3$). Such a solution enhances interstitial bonding between the OBG structure and the substrate. In one arrangement, the ratio of calcium to hexane can be approximately 1% to 2%. It should be noted that in some instances a calcium loading in excess of 2% may result in a brittle interfacial adhesion of the OBG structure 105 with the substrate.

Figure 2C:
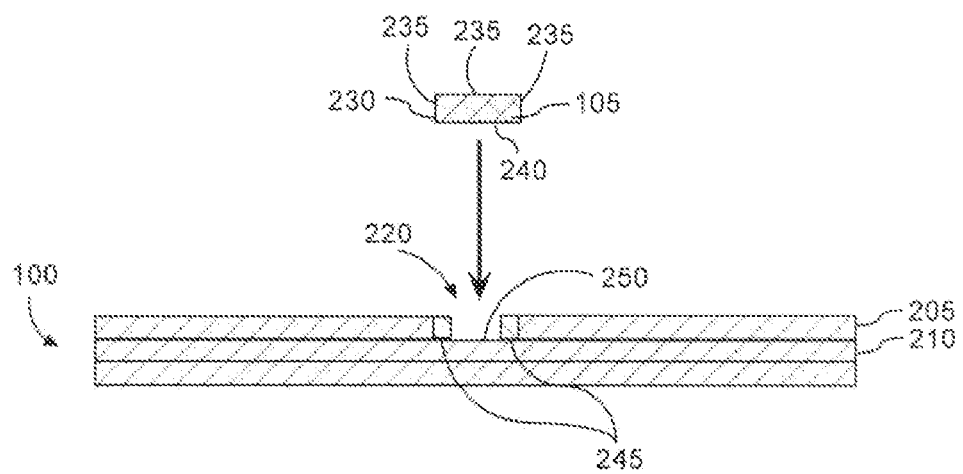
Figure 2D:
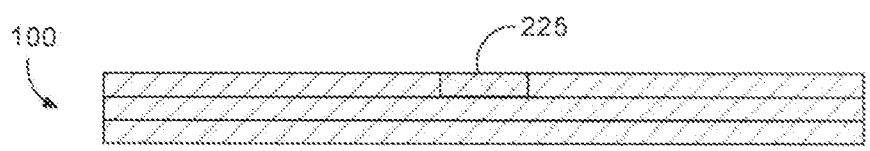

Referring to FIG. 2C, the OBG structure 105 having the coating of binding material 230 can be inserted into the via 220, or cavity, within the substrate 100. For example, the OBG structure 105 can be press fitted into the via 220 such that walls 235 and bottom portion 240 of the OBG structure 105 contact inner walls 245 of substrate layer 205 and upper surface 250 of substrate layer 210. Referring to FIG. 2D, the substrate 100 having the OBG structure 105 embedded therein is shown. Pre-fire and sintering operations then can be performed on the substrate 100, as discussed further below.

Figure 3:
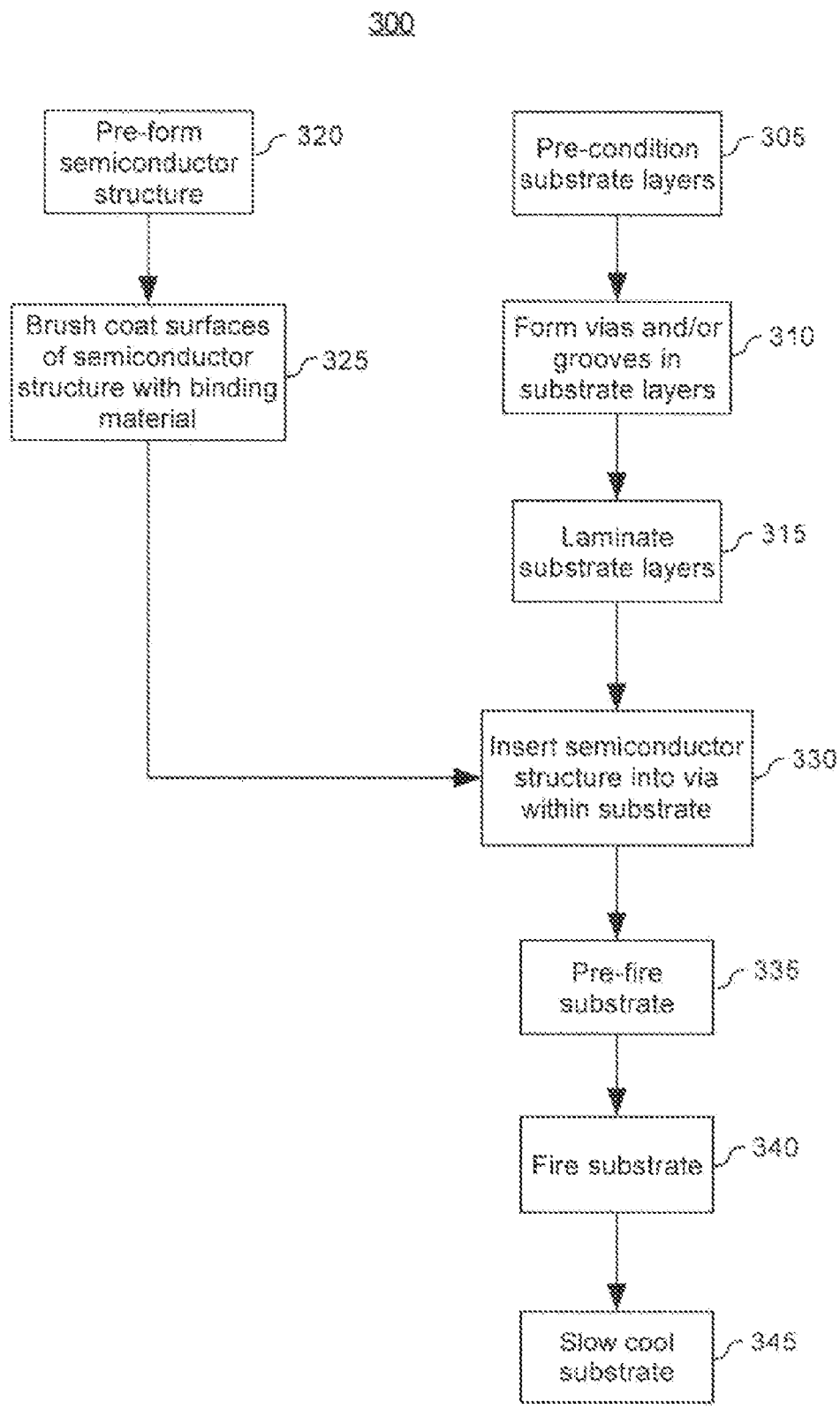
FIG. 3 is a flow chart of a method of manufacturing a ceramic substrate having an embedded OBG structure that is useful for understanding the present invention.

A method 300 of manufacturing a ceramic substrate having an embedded OBG structure is shown in FIG. 3. Referring to step 305, substrate layers can be preconditioned before being used in a fabrication process. For example, the substrate can be baked at an appropriate temperature for a specified period of time or left to stand in a nitrogen dry box for a specified period of time, as previously described.

Referring to step 310, one or more vias and/or grooves can be created in each of the substrate layers that are to incorporate vias. As previously noted, many techniques are available for forming bores in a substrate layer, such as mechanically punching, laser cutting, or etching holes into the substrate layer. In the preferred arrangement, the vias are formed after the preconditioning of the substrate layers. However, if a particular dielectric does not exhibit much shrinkage due to baking and sintering processes described below, the preconditioning step may not be required Continuing at step 315, the substrate layers can be laminated together after appropriate deposition and drying of any circuit traces that may be required. A variety of techniques for laminating substrates are known to those skilled in the art of substrate manufacturing, as noted.

Referring to step 320, an OBG structure can be pre-formed. The OBG structure then can be brush coated with a surface binding material, as shown in step 325. Proceeding to step 330, the OBG structure can be inserted into a respective via within the substrate.

Referring to step 335, the substrate then can undergo a pre-fire treatment. For example, the substrate can be baked at 25° C. to 350° C. for 45 minutes. Next, at step 340, the substrate can be sintered. In one arrangement, sintering can be a two step process. For instance, the substrate can be sintered at 350° C. to 875° C. for 45 minutes, and then sintered again at 875° C. for another 45 minutes. In another arrangement, the sintering temperature can be raised from 350° C. to 875° C. for 45 minutes, and then sintered again at 875° C. for another 45 minutes. In another arrangement, the sintering temperature can be raised from 350° C. to 875° C. over a period of 45 minutes, and then the temperature of 875° C. can be maintained for 45 minutes. Such firing processes can reduce thermally generated residual stresses that arise during the sintering process.

At this point the OBG structure will be adhered to the substrate and excess binding material will have been burned off. Proceeding to step 345, the substrate can be slow cooled from 875° C. to 25° C. over a period of 75 minutes. A slow cool is advisable to minimize residual stresses, thereby minimizing the risk of component cracking and separation of the OBG structure from the substrate.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method for embedding optical band gap (OBG) devices in a ceramic substrate comprising the steps of:
   pre-forming an OBG structure;
   coating a portion of the OBG structure that is to be in contact with said ceramic substrate with a surface binding material for providing adhesion between said OBG structure and said ceramic substrate;
   inserting the OBG structure into the ceramic substrate subsequent to coating the OBG structure; and
   performing firing operations on the ceramic substrate subsequent to inserting the OBG structure into the ceramic substrate.

2. The method according to claim 1, wherein said step of inserting the OBG structure comprises inserting the OBG structure into a via formed within the ceramic substrate.

3. The method according to claim 1, further comprising the step of slow cooling the ceramic substrate after said step of performing firing operations.

4. The method according to claim 1, wherein said step of pre-forming the OBG structure comprises pre-forming the OBG structure from at least one material selected from the group consisting of indium phosphide and indium gallium arsenide.

5. The method according to claim 1, wherein the ceramic substrate comprises a plurality of substrate layers.

6. The method according to claim 1, wherein the ceramic substrate comprises low temperature co-fired ceramic.

7. A method for embedding optical band gap (OBG) devices in a ceramic substrate comprising the steps of:
   pre-forming an OBG structure;
   coating a portion of the OBG structure that is to be in contact with said ceramic substrate with a surface binding material for providing adhesion between said OBG structure and said ceramic substrate;
   inserting the OBG structure into the ceramic substrate subsequent to coating the OBG structure; and
   performing firing operations on the ceramic substrate subsequent to inserting the OBG structure into the ceramic substrate, wherein said step of performing firing operations on the ceramic substrate comprises the steps of:
   pre-firing the ceramic substrate at a first temperature for a first duration of time; and
   sintering the ceramic substrate at a second temperature for a second duration of time.

8. A method for embedding optical band gap (OBG) devices in a ceramic substrate comprising the steps of:
   pre-forming an OBG structure;
   coating a portion of the OBG structure that is to be in contact with said ceramic substrate with a surface binding material for providing adhesion between said OBG structure and said ceramic substrate;
   inserting the OBG structure into the ceramic substrate subsequent to coating the OBG structure; and
   performing firing operations on the ceramic substrate subsequent to inserting the OBG structure into the ceramic substrate, wherein the surface binding material comprises calcium.

9. The method according to claim 8, wherein the surface binding material further comprises hexane.

10. The method according to claim 9, wherein a ratio of the calcium to the hexane is from about 1% to 2%.

* * * * *